United States Patent
Brown et al.

[11] Patent Number: 6,067,855
[45] Date of Patent: May 30, 2000

[54] APPARATUS AND METHOD FOR MEASURING LIQUID LEVEL IN A SEALED CONTAINER

[75] Inventors: Ian G. Brown; William S. Brennan, both of Austin, Tex.

[73] Assignee: Advanced Micro Devices, Inc., Sunnyvale, Calif.

[21] Appl. No.: 09/304,872

[22] Filed: May 4, 1999

[51] Int. Cl.[7] .................................................... G01F 23/30
[52] U.S. Cl. ..................................................................... 73/308
[58] Field of Search .............................. 73/305, 306, 307, 73/308, 309, 313, 314; 141/31

[56] References Cited

U.S. PATENT DOCUMENTS

| | | | |
|---|---|---|---|
| 3,715,539 | 2/1973 | Silberg et al. | 73/313 |
| 3,976,963 | 8/1976 | Kübler | 73/313 |
| 3,992,941 | 11/1976 | McGoldrick | 73/313 |
| 4,056,979 | 11/1977 | Bongort et al. | 73/313 |
| 4,796,473 | 1/1989 | Custer | 73/308 |
| 5,156,048 | 10/1992 | DeFigueiredo et al. | 73/308 |
| 5,636,548 | 6/1997 | Dunn et al. | 73/313 |

*Primary Examiner*—William Oen
*Attorney, Agent, or Firm*—Kevin L. Daffer; Conley, Rose & Tayon

[57] ABSTRACT

A system and method for measuring ampoule liquid level are presented. A buoy is arranged entirely within and detached from the ampoule. The buoy contains enough matter having a density less than that of the liquid to maintain flotation of the buoy, and has an exterior surface formed from a non-reactive material. The buoy is further designed to not interfere with any inlet or outlet structures of the ampoule. At least one magnet is displaced within the buoy such that the magnet is located near the ampoule's interior wall when the buoy is arranged within the ampoule. At least one sensor strip is located along the height of and entirely outside of the ampoule's interior wall, and at least one electronic sensor, containing at least one magnetically actuated switch, is located within each sensor strip. The electronic sensor may also contain a visible indicator and/or a resistor. The electronic sensor may be electronically connected to at least one separate system. In a method of using the system to measure the ampoule's liquid level, the buoy is arranged within the ampoule and the sensor strip is arranged outside the ampoule. As the magnet in the buoy passes near a magnetically actuated switch outside the ampoule, the switch closes to either illuminate a visual indicator or signal a separate system.

32 Claims, 6 Drawing Sheets

APPARATUS AND METHOD FOR MEASURING LIQUID LEVEL IN A SEALED CONTAINER

BACKGROUND OF THE INVENTION

1. Field of the Invention

This invention relates to a magnetic sensor system and the use of this system for measuring the liquid level within an opaque ampoule.

2. Description of the Related Art

Fabrication of a metal-oxide-semiconductor (MOS) integrated circuit (IC) involves numerous processing steps. A gate dielectric, typically formed from silicon dioxide ("oxide"), is formed on a semiconductor substrate which is doped with either n-type or p-type impurities. For each MOS field effect transistor (MOSFET) being formed, a gate conductor is formed over the gate dielectric, and dopant impurities are introduced into the substrate to form a source and drain. Such transistors are connected to each other and to terminals of the completed integrated circuit using conductive interconnect lines. Typically, multiple levels of interconnect are needed to provide the connections necessary for a modern, high-transistor-density IC.

Many of the processing steps mentioned above involve deposition of a material layer onto a semiconductor topography (semiconductor substrate with overlying layers and structures). Chemical vapor deposition (CVD) is a commonly used technique for material deposition in semiconductor processing. For example, a gate conductor is typically patterned from a polysilicon layer deposited using CVD. Interlevel dielectrics, which insulate layers of interconnect from each other and from underlying devices, are also generally deposited using CVD. Interconnect formation often involves deposition of metal films by either CVD or by physical vapor deposition (PVD) methods, such as evaporation or sputtering.

CVD methods involve exposing a substrate to gases, known as precursors, which undergo a chemical reaction to form the desired material on the substrate surface. The substrate is generally heated to provide energy both for the chemical reaction to occur, and for the deposited atoms to migrate on the surface of the growing layer and form stable bonds. The desired precursors should react such that the desired material remains on the substrate surface, while remaining precursor components are not incorporated into the deposited film. It is also desirable, for example, that the precursors react to deposit a film only upon the substrate, so that coating of deposition chamber walls and fixtures is minimized. Constraints such as these can make selection of suitable precursors challenging. For some materials, precursors are available in a relatively convenient form. For example, oxide may be deposited using silane and oxygen, or silane and nitrous oxide precursors. These precursors are readily available as bottled gases.

CVD of metals, on the other hand, often requires metal organic sources, many of which are liquid at room temperature. Examples of such liquid metal organic sources are dimethyl aluminum hydride (DM AH), used in CVD of aluminum, and tetrakis (dimethylamino) titanium (TDMAT), used as a precursor for CVD of titanium nitride. Use of liquid sources in CVD typically requires that a gas be bubbled through the liquid so that a vapor of the liquid is formed. The substrate may then be exposed to this vapor, along with any other needed precursors, during the CVD process. The liquid precursors are often enclosed in sea led ampoules for this purpose.

Ampoules typically have an input and an output to the sealed container. The input carries gas into and near the bottom of the sealed container. When liquid is within the sealed container, the gas bubbles through the liquid as it rises toward the top of the sealed container. The gas combines with the liquid to form a vapor such that the upper portion of the sealed container is filled with the vapor. The output carries the vapor out of the sealed container, and, thus, creating a vapor flow output from the ampoule.

Most ampoules used in semiconductor wafer fabrication equipment are sealed containers capable of being pressurized and capable of housing erosive or volatile chemicals. Hence, the ampoule is often made from an opaque material preventing a view of the liquid level within the sealed container. Often there is a need to know the liquid level within the ampoule. Measuring the liquid level within a pressurized and opaque ampoule is often necessary to ensure that the liquid level does not become so low that it prevents the ampoule from functioning properly. For example, semiconductor wafer fabrication facilities often utilize ampoules to contain liquid metal organic precursor (e.g., TDMAT) for CVD processes. Pressurized gas bubbles through the liquid metal organic precursor within the ampoule creating a liquid metal organic vapor output. If too little or no liquid is in the ampoule, then the ampoule will not provide a proper liquid metal organic vapor output for the CVD process.

A current method used in semiconductor fabrication facilities for determining the liquid level within an ampoule is to, first, pressurize the ampoule. Next, the gas volume within the ampoule is measured. Based on the measured gas volume, the volume of liquid remaining within the ampoule is calculated. Then, the liquid level is derived from the estimated liquid volume. This current method is an indirect means for determining the liquid level and liquid amount within the sealed ampoule. Hence, it may inaccurately quantify the liquid volume within the ampoule. Such inaccuracy may cause numerous process and product quality issues. Running out of the proper amount of liquid within an ampoule can result in lack of proper CVD on a semiconductor wafer. Such improper CVD can cause defective products or unacceptable quality levels. In addition, this current method of measuring the liquid level within an ampoule may cause excessive equipment downtime at CVD operations employing this method of liquid level determination because it disrupts the flow of the CVD operations while measuring the gas volume within the ampoule. Downtime for semiconductor wafer fabrication equipment is very costly and should be avoided whenever possible. It would therefore be desirable to develop a method and apparatus for more accurately determining the liquid level within an ampoule. The desired method and apparatus should also allow the liquid level within an ampoule to be measured without disrupting the ampoule's output flow, so that downtime is minimized.

SUMMARY OF THE INVENTION

Many of the problems outlined above are addressed by the system and method hereof. The system described herein can measure the liquid level within a pressurized and opaque ampoule without disrupting the vapor flow output from the ampoule. Thus, the system herein may reduce downtime in semiconductor wafer fabrication operations. Also, the system herein may reduce the risk of faulty CVD, and thereby improve quality assurance.

An ampoule liquid level sensing system comprising a buoy and sensor strip is contemplated herein. The buoy is designed for placement entirely within and detached from an ampoule. At least the exterior surface of the buoy is a material non-reactive to the liquids and gases which may be contained within or moving through the ampoule. This non-reactive material protects the buoy from erosion and maintains the purity of the liquids and gases. The buoy contains enough matter having a density less than that of any liquids to be contained by the ampoule to maintain buoy floatation in these liquids. The buoy is designed to be vertically unrestrained within the ampoule such that the buoy does not interfere with any inlet and outlet structures of the ampoule. Such unrestraint ensures that the buoy can freely move up and down with the liquid level while also not blocking the gaseous flow through the ampoule.

At least one magnet is displaced within the buoy such that the magnet is located near the ampoule's interior wall when the buoy is placed inside the ampoule. At least one sensor strip is designed for placement along the height of and entirely outside of the ampoule's interior wall. The sensor strip may contain at least one electronic sensor. The electronic sensor may comprise at least one magnetically actuated switch, at least one visible indicator, and at least one resistor. The electronic sensor is triggered by the at least one magnet within the buoy. When the magnetically actuated switch is closed by the magnetic force from the magnet within the buoy, the switch completes an electric circuit that provides electricity to the visible indicator. Thus, the electronic sensor detects the liquid level within the ampoule, and it provides an indication of that level by illuminating the corresponding visible indicator.

In an alternative embodiment, the sensor strip may contain at least one magnetic switch and no indicators. Such sensor strip sends an electrical signal to a separate system. The electrical signal sent to the separate system corresponds to the magnetic switch proximate to the buoy. Because the buoy location corresponds to the liquid level within the ampoule, the location of the magnetic switch activated by being proximate to the buoy also corresponds to the liquid level within the ampoule. The separate system may be a computer that records and monitors the liquid level within the ampoule. Also, the separate system may be a computer or logic circuit that automatically controls equipment for refilling the ampoule with liquid when the liquid levels become low. The at least one electronic sensor or the at least one magnetic switch that triggers a separate system might be located only near the bottom of the ampoule rather than all along the height of the ampoule, top to bottom.

The buoy may have a ring geometry corresponding to a cylindrical ampoule geometry. In embodiments for which more than one magnet is used, the magnets may be circumferentially distributed around the buoy to ensure that at least one magnet radially aligns near the sensor strip. Such circumferential distribution accommodates for unpredictable rotations of the buoy about a vertical axis of rotation.

Depending on the nature of the fluid used, the ampoule associated with the system described above may be supplied with the liquid factory-sealed inside, such that the ampoule is replaced with a new one when the liquid is depleted. Alternatively, the ampoule may have a seal which can be opened so that the ampoule is user-fillable and refillable. In the case of such a refillable ampoule, the sensor signal associated with the system described above may be electrically connected to a separate system, such as a computer or a controller, which can initiate an automatic refill of the ampoule when the liquid level drops below a predetermined threshold.

The system described above may take various forms, depending on the intended user of the system. For example, the system may take the form of a kit to be used by ampoule manufacturers to form an ampoule with an associated liquid level measurement system. This kit would typically include a liquid level indicator containing one or more of the sensors described above, along with a magnet-containing buoy as described above. In the case of ampoules which may be opened by the user of the ampoule, the kit may be combined with such an ampoule by the user. Alternatively, the system could include the ampoule, and take the form of an ampoule with an associated liquid level measurement system. In the case, for example, of ampoules which are replaced when empty, an ampoule could also be equipped with only a buoy, for use with a removable liquid level indicator at the user's location. The liquid level indicator would contain one or more of the magnetically-actuated sensors described above.

The present system may be utilized according to an improved method for measuring the liquid level within an ampoule. The ampoule typically has at least one inlet and at least one outlet. The inlet may carry at least one gaseous flow into the liquid within the ampoule. As the at least one gaseous flow bubbles through the liquid, a vapor may be formed and carried out of the ampoule through the at least one outlet. The method comprises buoyantly supporting at least one magnet displaced within a buoy entirely inside the ampoule. The at least one magnet is insulated within the buoy from chemically and corrosively reacting with the liquid and with any gases flowing within the ampoule. The at least one magnet is maintained at a vertical level corresponding to the top surface of the liquid within the ampoule. At least one magnetically actuated switch, preferably a magnetic reed switch, which is located outside the ampoule's inner wall, is switched using the magnetic force from the at least one magnet. An electrical circuit is completed by switching the magnetically actuated switch. The current within the electrical circuit completed by the switch illuminates at least one visible indicator, preferably a light-emitting diode (LED) indicator. The illuminated at least one visible indicator corresponds to the switched at least one magnetically actuated switch. The visible indicator is entirely outside the ampoule's inner wall. The liquid level within the ampoule is indicated with the at least one illuminated visible indicator because it corresponds to vertical position of the at least one magnet and the top surface of the liquid within the ampoule.

The at least one magnetically actuated switch and corresponding at least one visible indicator used in the method herein might be located only near the bottom of the ampoule instead of all along the height of the ampoule, from top to bottom. Also, instead of having at least one magnetically actuated switch with a corresponding visible indicator, the method herein might utilize a system with at least one magnetic switch that signals or triggers at least one separate system instead of illuminating a visible indicator.

BRIEF DESCRIPTION OF THE DRAWINGS

Other objects and advantages of the invention will become apparent upon reading the following detailed description and upon reference to the accompanying drawings in which.

Figure 1:
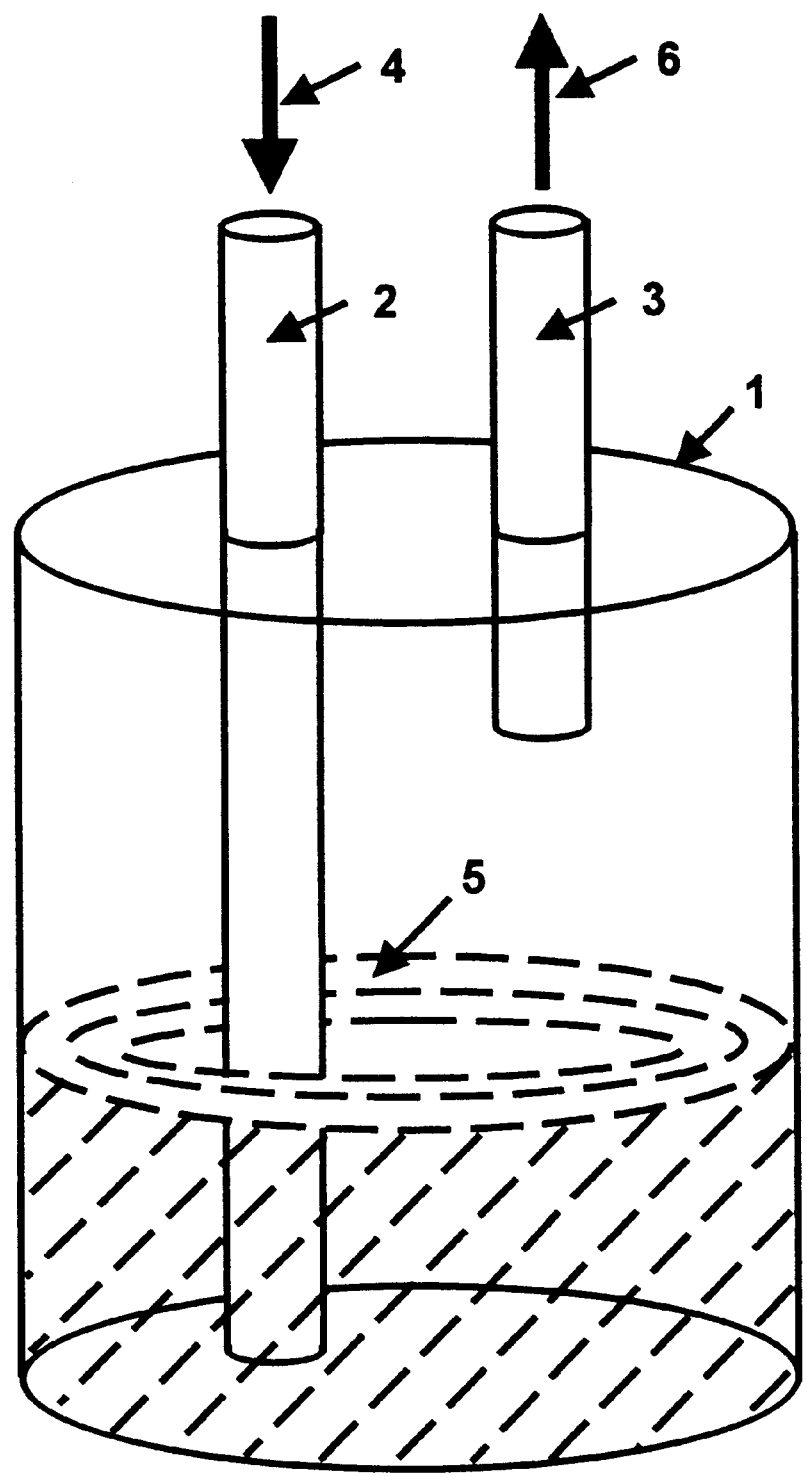
FIG. 1 shows a typical ampoule having an input and output flow.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning now to the drawings, FIG. 1 shows a typical ampoule, or sealed container, 1 having an input 2 and an output 3. Ampoule 1 contains a liquid 5. The primary function of an ampoule such as ampoule 1 is to create a vapor flow 6 at output 3. Input 2 carries a gas 4 into and near the bottom of ampoule 1. When liquid 5 is within ampoule 1, gas 4 bubbles through liquid 5 as it rises toward the top of ampoule 1. Gas 4 combines with liquid 5 to form a vapor. After the gas bubbles through the liquid, the upper portion of ampoule 1 becomes filled with the newly formed vapor. Output 3 carries the vapor out of ampoule 1, thus creating a vapor flow output 6. Typically, the ampoule is opaque because the ampoule is made from a material (i.e., stainless steel) capable of withstanding high pressure gas flow 4 while also being non-reactive to liquid 5 and gas flow 4. Most ampoules used in semiconductor wafer fabrication equipment do not have view ports or provisions for internal wiring. Although the ampoule shown in FIGS. 1–6 is cylindrical in shape, other ampoule shapes may also be suitable for the apparatus recited herein. For example, rectangular or spherical ampoules may be used.

Figure 2:
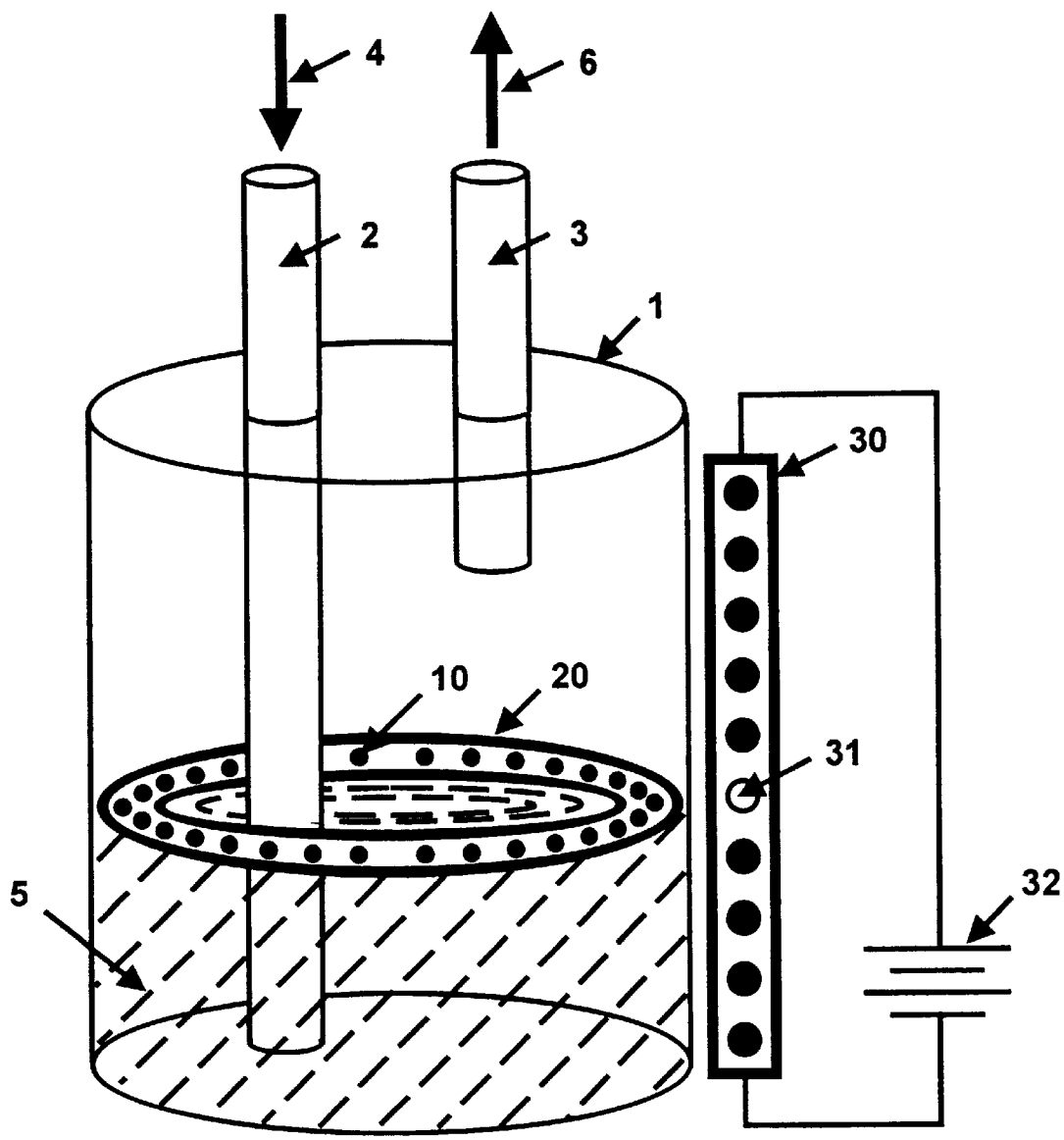
FIG. 2 shows one possible embodiment of the contemplated ampoule liquid level sensing system, including a sensor strip containing an array of electronic sensors distributed vertically along the height of a cylindrical ampoule, wherein the sensors have LED indicators.

FIG. 2 shows one possible embodiment of the contemplated ampoule liquid level sensing system having a sensor strip 30 containing an array of electronic sensors 31 distributed vertically along the height of a cylindrical ampoule 1. A buoy 20 shaped like a ring is entirely within ampoule 1, but buoy 20 is a separate piece from ampoule 1. The buoy is made from a material (e.g., Teflon) that will not react with the particular liquid 5 chosen for use within ampoule 1, nor will the buoy material react with gas flow 4. However, other embodiment variations may have just the exterior surface of buoy 20 being non-reactive to liquid 5 and gas flow 4. With a non-reactive exterior surface, the buoy interior can be a material that is reactive with liquid 5 or gas flow 4, since this interior does not come into contact with the liquid or gas. Buoy 20 must contain enough matter having a density less than liquid 5 to maintain floatation of buoy 20 at the surface of liquid 5. For example, buoy 20 may be hollow, containing pockets of air or gas, because gas is less dense than liquid 5. Forming portions of buoy 20 from a foam would be a way of achieving such pockets of air or gas. Yet, buoy 20 could also contain a solid substance that has a density less than that of liquid 5. The primary concern is that the buoy stays afloat at the surface of liquid 5.

Buoy 20 is vertically unrestrained within the ampoule 1 because buoy 20 must be free to rise and fall with the surface of the liquid as the liquid amount within the ampoule 1 varies. Hence, buoy 20 must be unobstructed by inlet 2 and outlet 3. Buoy 20 should have sufficient clearance within the ampoule walls, around inlet 2, and around outlet 3, as well as any other components within an ampoule, to ensure that buoy 20 will consistently and reliably maintain a steady position at the liquid surface. Also, buoy 20 must not block gas flow 4 as it bubbles through liquid 5 and passes through outlet 3.

Sensor strip 30 is located along the height of ampoule 1. Sensor strip 30 is entirely outside of the interior surface of the ampoule wall because liquid 5 is sealed within the interior surface. For example, sensor strip 30 may be attached to the exterior surface of the ampoule wall. Alternatively, sensor strip 30 may be partially or completely embedded within the ampoule wall, as long as the sensors are not in contact with liquid 5. Sensor strip 30 shown in FIG. 2 spans the height of the ampoule 1 so that the liquid level within ampoule 1 may be detected at several levels, from the top to the bottom of the ampoule. Sensor strip 30 contains an array of electronic sensors 31. Each electronic sensor 31 is activated by magnetic force. Hence, an electronic sensor 31 is activated when a magnet is passed near it. Electronic sensors 31 can be powered by a DC power source 32 (e.g., 12 or 24 volts). The accuracy of the liquid level measurement depends on the number of and spacing between sensors 31. In an alternative embodiment, sensors 31 may be used without sensor strip 31. For example, sensors 31 could be individually attached to or embedded within the wall of ampoule 1.

Magnets 10 are displaced within buoy 20. The primary function of magnets 10 is to activate an electronic sensor 31 closest to the vertical location of buoy 20, which should correspond to the liquid level within ampoule 1. Thus, the liquid level can be sensed and indicated by an electronic sensor 31 without the need to see inside the ampoule and without disrupting vapor flow 6.

Magnets 10 can vary in size and magnetic strength, as well as material properties. In a preferred embodiment, the magnets should have the maximum magnetic strength to weight ratio (e.g., rare earth magnets) because the buoy must maintain floatation without being so bulky as to interfere with components within the ampoule (e.g., inlet 2, outlet 3) or block gas flow 4 bubbling through liquid 5. In a preferred embodiment, magnets 10 are circumferentially distributed around buoy 20. Such circumferential distribution compensates for rotation of buoy 20 about a vertical axis to ensure that at least one magnet 10 is radially aligned with or near sensors 31. In embodiments for which a sensor strip is used to mount sensors 31, it is essential that at least one magnet 10 is radially aligned near sensor strip 30 to activate an electronic sensor 31. However, another possible embodiment can use only one magnet as long as there is a means for preventing the buoy from rotating about a vertical axis while also not restricting vertical movement of the buoy. Such means of preventing rotation can include at least one vertical slot in the ampoule 1 that at least one tab of buoy 20 slides within.

Figure 3:
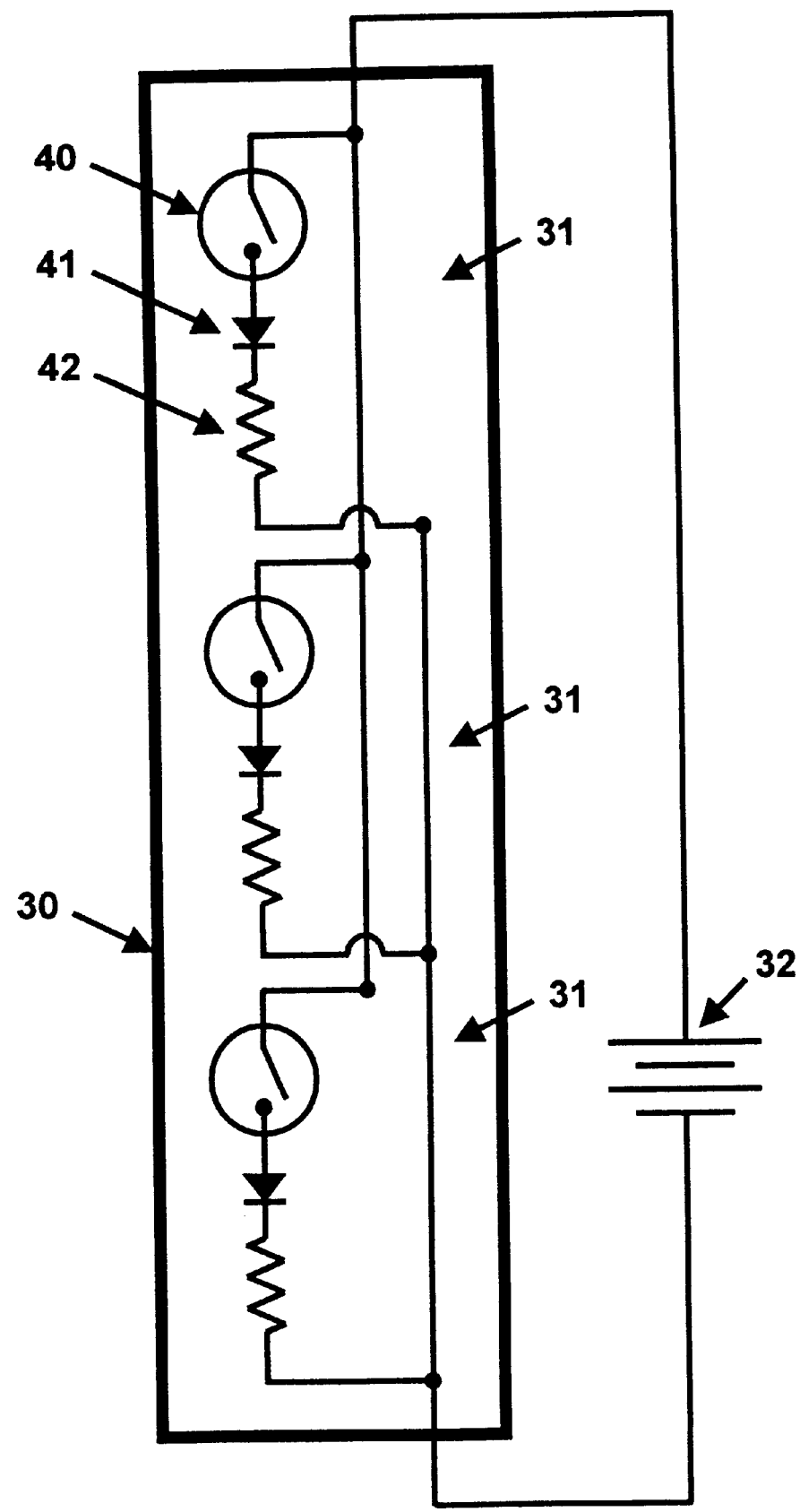
FIG. 3 shows one possible embodiment of the sensor strip wherein each electronic sensor comprises a magnetic reed switch, an LED indicator, and a resistor.

FIG. 3 illustrates a possible embodiment of electronic sensors 31 within sensor strip 30. In the FIG. 3 embodiment, each electronic sensor 31 comprises three main components: magnetic reed switch 40, LED indicator 41, and resistor 42. As a magnet 10 passes near a magnetic reed switch 40, switch 40 is closed, completing the electronic circuit for that electronic sensor 31. Other magnetically actuated switches may also be suitable in place of magnetic reed switch 40. When the electronic circuit is completed, LED indicator 41 illuminates. Other visible indicators which may be suitable in place of LED indicator 41 include incandescent lamps and liquid crystal indicators. Resistor 42 provides the proper current for the other components corresponding to the voltage level of power source 32 (e.g., 1.1 k ohm for 12 volt input, 2.2 k ohm for 24 volt input).

Applying the FIG. 3 electronic sensor embodiment to the FIG. 2 system embodiment, when a magnet 10 within buoy 20 (floating on the surface of the liquid 5 within the ampoule 1) passes near an electronic sensor 31, magnetic reed switch 40 within electronic sensor 31 is switched. When magnetic reed switch 40 is switched, the corresponding LED indicator 41 lights up. Therefore, the liquid 5 level within ampoule 1 is indicated by the position of illuminated LED indicator 41 within electronic sensor 31.

Figure 4:
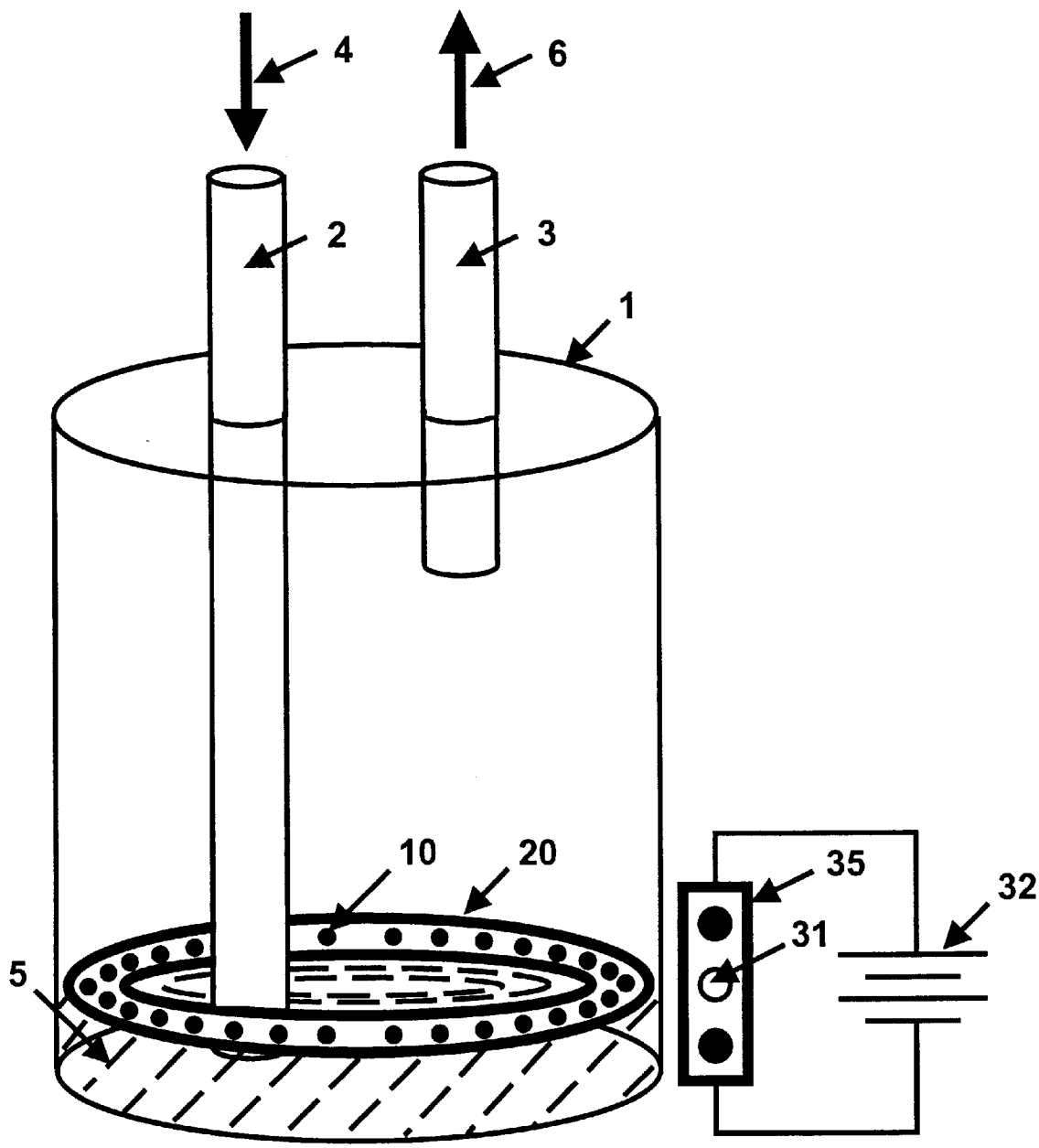
FIG. 4 shows another possible embodiment of the contemplated ampoule liquid level sensing system having a sensor strip containing an array of electronic sensors distributed vertically along the height of a cylindrical ampoule but located only near the bottom of the ampoule, wherein the sensors have LED indicators.

FIG. 4 illustrates another possible embodiment of the contemplated ampoule liquid level sensing system having a sensor strip 35 containing an array of electronic sensors distributed vertically along the height of a cylindrical ampoule. The FIG. 4 embodiment is basically the same as the FIG. 2 embodiment, but the electronic sensors 31 are located only near the bottom of ampoule 1. Hence, in the FIG. 4 embodiment the liquid 5 level is only indicated when the liquid level becomes low or as the liquid level approaches a quantity requiring ampoule 1 to be refilled with more of liquid 5. As noted above, sensors 31 could also be mounted without using a sensor strip such as strip 35, for all embodiments of the system described herein.

Figure 5:
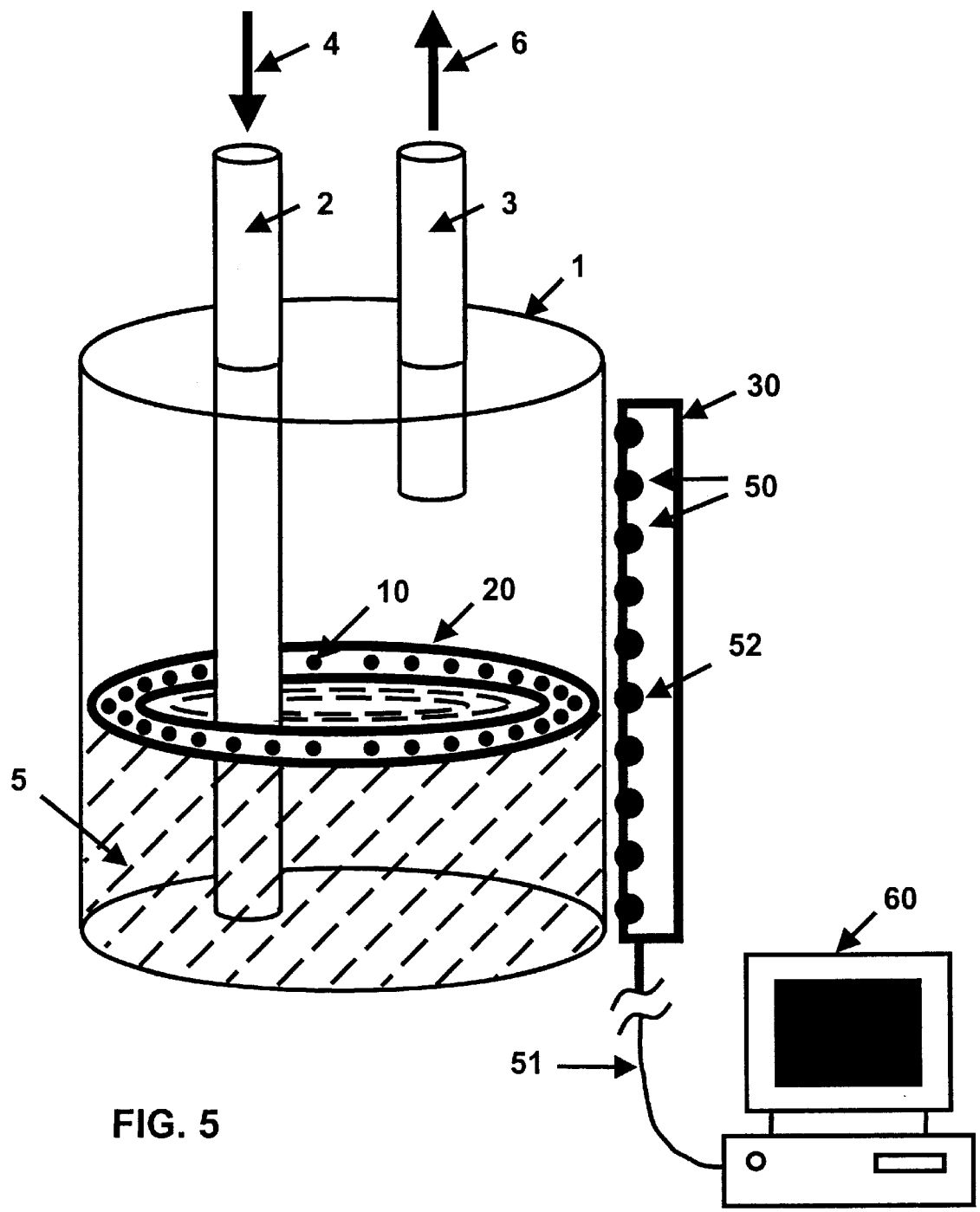
FIG. 5 shows another possible embodiment of the contemplated ampoule liquid level sensing system having a sensor strip containing an array of magnetic switches distributed vertically along the height of a cylindrical ampoule, wherein the magnetic switches electronically trigger some action in a separate system.

FIG. 5 illustrates another possible embodiment of the contemplated ampoule liquid level sensing system having a sensor strip 30 containing an array of magnetic switches 50 distributed vertically along the height of a cylindrical ampoule 1, wherein the magnetic switches 50 electronically trigger some action in a separate system 60. Magnetic switch 52 is the one of magnetic switches 50 which is nearest to buoy 20 at a given time. The FIG. 5 embodiment is similar to the FIG. 2 embodiment, but the FIG. 5 embodiment does not include indicators, such as LEDs, in sensor strip 30. As the magnets 10 within buoy 20 move along the length of sensor strip 30, the proximate magnetic switch 52 switches and, thereby, completes an electric circuit containing proximate magnetic switch 52. Sensor strip 30 is electrically connected 51 to a separate system 60 (e.g., a data acquisition computer interface and/or a computer controlled automation process that refills the ampoule 1 with liquid 5 as needed). Thus, when proximate magnetic switch 52 is activated, separate system 60 receives an electronic voltage via electronic connection 51 corresponding to the particular activated switch 50. Each magnetic switch 50 within sensor strip 30 corresponds to a different vertical position of buoy 20 within the ampoule 1. Therefore, activating a particular magnetic switch 50 using magnets 10 within buoy 20 provides a measurement of the ampoule liquid level to separate system 60 that may react according to the liquid level.

Figure 6:
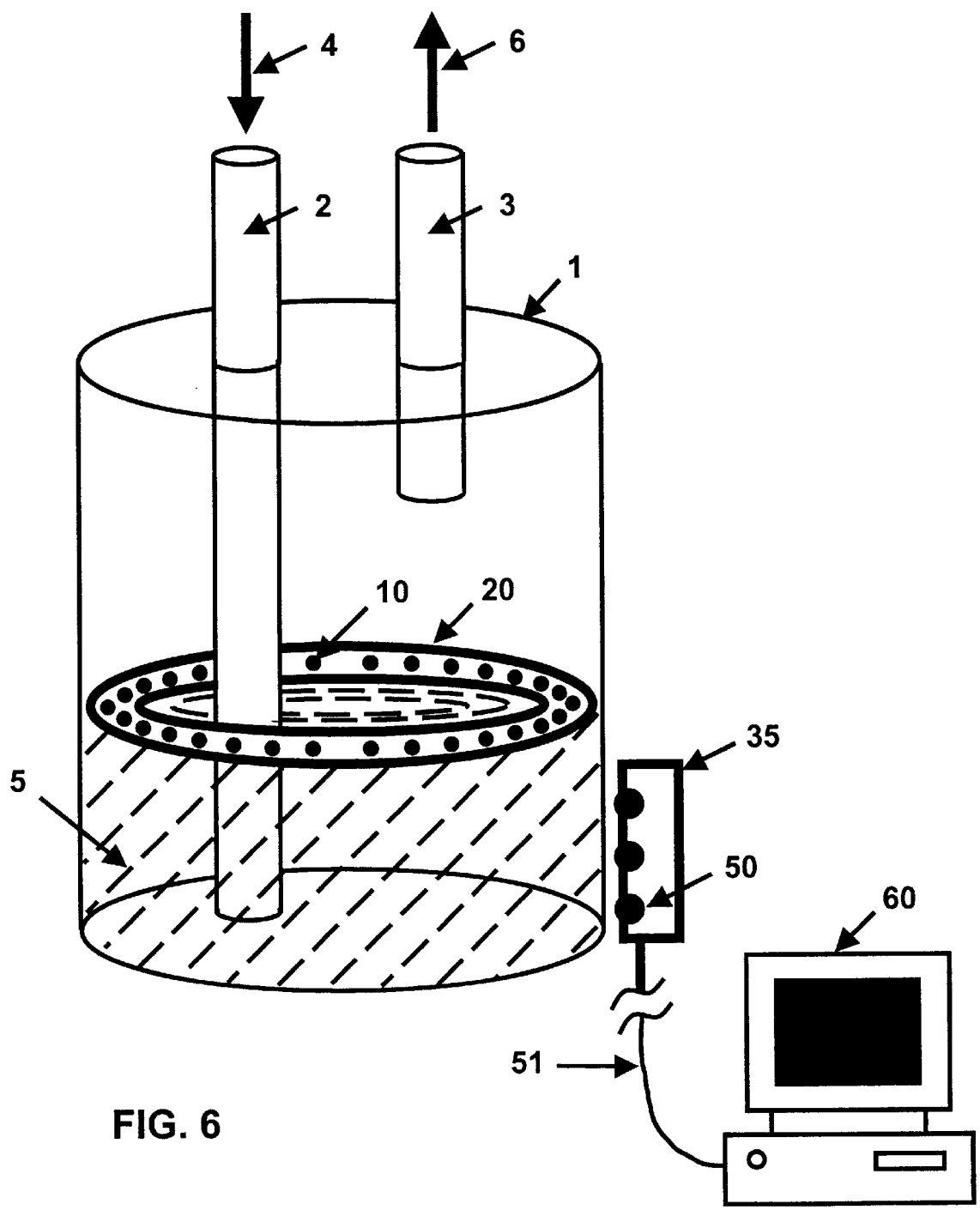
FIG. 6 shows still another possible embodiment of the contemplated ampoule liquid level sensing system having a sensor strip containing an array of magnetic switches distributed vertically along the height of a cylindrical ampoule but located only near the bottom of the ampoule, wherein the magnetic switches electronically trigger some action in a separate system.

FIG. 6 illustrates yet another possible embodiment of the contemplated ampoule liquid level sensing system having a sensor strip 35 containing an array of magnetic switches 50 distributed vertically along the height of a cylindrical ampoule, wherein the magnetic switches 50 electronically trigger some action in a separate system 60. The FIG. 6 embodiment is basically the same as the FIG. 5 embodiment, but the magnetic switches 50 are located only near the bottom of the ampoule 1. Hence, in the FIG. 6 embodiment the magnetic switches 50 only become activated and signal the separate system 60 when the liquid 5 level becomes low or as the liquid level approaches a quantity requiring the ampoule 1 to be refilled with more liquid 5.

It will be appreciated to those skilled in the art having the benefit of this disclosure that this invention is believed to provide an apparatus and method for measuring the level of a liquid within an ampoule. Further modifications and alternative embodiments of various aspects of the invention will be apparent to those skilled in the art in view of this description. It is intended that the following claims be interpreted to embrace all such modifications and changes and, accordingly, the specification and drawings are to be regarded in an illustrative rather than a restrictive sense.

What is claimed is:

1. An ampoule liquid level sensing system, comprising:
   an ampoule comprising an inlet and an outlet;
   a buoy adapted for placement within and physically separate from the ampoule, wherein an exterior surface of the buoy comprises a material substantially non-reactive to liquids or gases which may be contained within or flow through the ampoule, and wherein the buoy is adapted for flotation at or near an upper surface of a liquid which may be contained within the ampoule; and
   a magnet displaced within the buoy such that the magnet is located near an interior surface of a wall of the ampoule when the buoy is placed within the ampoule.

2. The ampoule liquid level sensing system as recited in claim 1, further comprising an electronic sensor located external to the interior surface of the wall of the ampoule, wherein the sensor comprises a magnetically actuated switch.

3. The ampoule liquid level sensing system as recited in claim 1, wherein the buoy has a ring geometry corresponding to a cylindrical ampoule geometry, and wherein at least two magnets are circumferentially distributed around the buoy.

4. The ampoule liquid level sensing system as recited in claim 2, wherein the electronic sensor comprises a magnetically actuated switch, and wherein the magnetically actuated switch is electronically connected to a separate system.

5. The ampoule liquid level sensing system as recited in claim 2, wherein said electronic sensor is located within a sensor strip adapted for placement along a vertical dimension of the ampoule and external to the interior surface of the wall of the ampoule.

6. The ampoule liquid level sensing system as recited in claim 5, wherein the electronic sensor is arranged within a sensor strip such that the electronic sensor is located near a lower end of the vertical dimension of the ampoule when the sensor strip is placed along the vertical dimension of the ampoule and outside of the interior surface of the wall of the ampoule.

7. The ampoule liquid level sensing system as recited in claim 2, wherein the electronic sensor is at least partially embedded in the wall of the ampoule.

8. The ampoule liquid level sensing system as recited in claim 2, wherein the electronic sensor is attached to an exterior surface of the wall of the ampoule.

9. The ampoule liquid level sensing system as recited in claim 5, wherein the sensor strip is at least partially embedded in the wall of the ampoule.

10. The ampoule liquid level sensing system as recited in claim 5, wherein the sensor strip is attached to an exterior surface of the wall of the ampoule.

11. The system as recited in claim 1, wherein said buoy further comprises sufficient material having a density less than a density of the liquid such that the buoy floats on the upper surface of the liquid.

12. The system as recited in claim 1, wherein said magnet comprises a rare earth magnet.

13. The system as recited in claim 2, wherein said magnetically actuated switch comprises a magnetic reed switch.

14. The system as recited in claim 2, wherein said electronic sensor further comprises a visible indicator.

15. The system as recited in claim 14, wherein said visible indicator comprises a light-emitting diode.

16. The system as recited in claim 14, wherein said electronic sensor further comprises a resistor.

17. The system as recited in claim 1, wherein said buoy further comprises a tab which moves in a slot formed on the interior surface of the wall of the ampoule as an elevation of the upper surface of the liquid changes, such that the buoy is prevented from rotating within the plane of the upper surface of the liquid.

18. A method for measuring a liquid level within an ampoule, comprising measuring a vertical displacement of a magnet-containing buoy buoyantly supported at or near an upper surface of a liquid contained within the ampoule, wherein the buoy moves in a vertical direction in response to changes in a level of the upper surface of the liquid, and wherein said measuring a vertical displacement further comprises detecting the status of a sensor positioned external to an interior surface of a wall of the ampoule, wherein the sensor is magnetically triggered by the magnet-containing buoy.

19. The method as recited in claim 18, wherein said detecting the status of the sensor comprises observing a visual indicator electrically coupled to a magnetically actuated switch, and wherein the visual indicator is illuminated when the magnet-containing buoy is at an elevation approximately equal to an elevation of the sensor.

20. The method as recited in claim 18, wherein said detecting the status of a sensor comprises recording the status using a logic device attributable to a computer, wherein the logic device is electrically coupled to a magnetically actuated switch associated with the sensor.

21. The method as recited in claim 18, further comprising inserting a fluid into the ampoule.

22. The method as recited in claim 21, wherein said inserting a fluid is initiated in response to a signal from a logic device indicating that the liquid level is below a predetermined threshold level.

23. The method as recited in claim 18, wherein said detecting the status of a sensor comprises detecting the status of a sensor located near a lower end of a vertical dimension of the ampoule, such that a lowering of the liquid level to a level near the lower end of the vertical dimension of the ampoule may be detected.

24. The method as recited in claim 18, further comprising flowing a gas into the ampoule through an inlet, through the liquid, and out of the ampoule through an outlet, such that a portion of the liquid is removed from the ampoule.

25. A kit for measuring a liquid level within a container, comprising:

a magnet-containing buoy adapted for placement within the container, wherein the buoy moves in a vertical direction in response to changes in a level of an upper surface of a liquid within the container; and a level indicator adapted for placement external to the container, such that the level indicator is magnetically responsive to movements of the buoy within the container.

26. The kit as recited in claim 25, wherein said container comprises an ampoule for containing deposition precursors used in semiconductor fabrication.

27. The kit as recited in claim 25, wherein said buoy comprises:

an exterior surface substantially non-reactive to the liquid within or gases which may flow through the container; and a magnet within the buoy such that the magnet is protected from the liquid or gases by the exterior surface.

28. The kit as recited in claim 25, wherein the level indicator comprises a sensor comprising a magnetically actuated switch.

29. The kit as recited in claim 28, wherein the sensor further comprises a visual indicator.

30. The kit as recited in claim 29, wherein the visual indicator comprises a light-emitting diode.

31. The kit as recited in claim 28, wherein the sensor is adapted for electrical connection to an execution unit attributable to a computer system.

32. The kit as recited in claim 28, wherein the level indicator further comprises a sensor strip, wherein the sensor is upon or within the sensor strip, and wherein the sensor strip is adapted for placement along a vertical dimension of and external to an interior surface of a wall of the container.

* * * * *